Patented Sept. 21, 1937

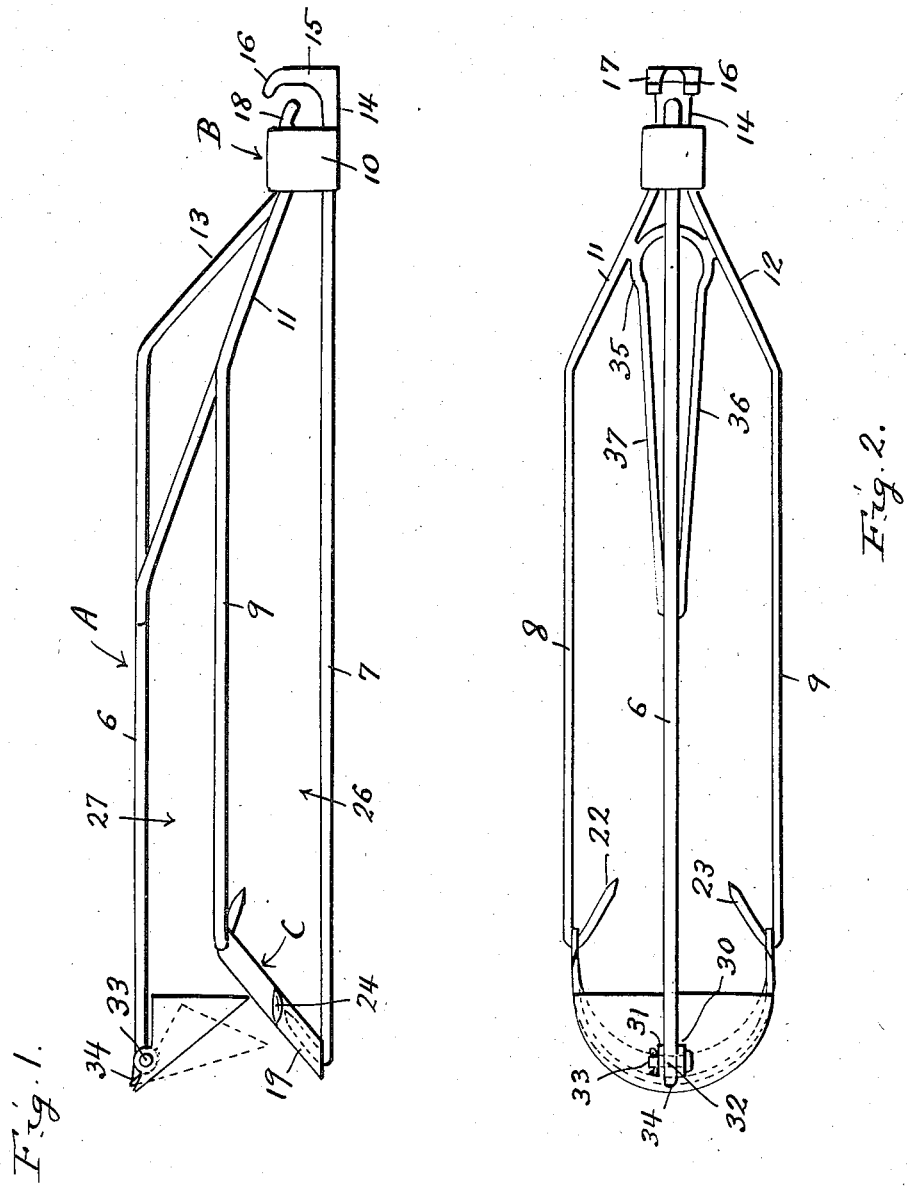

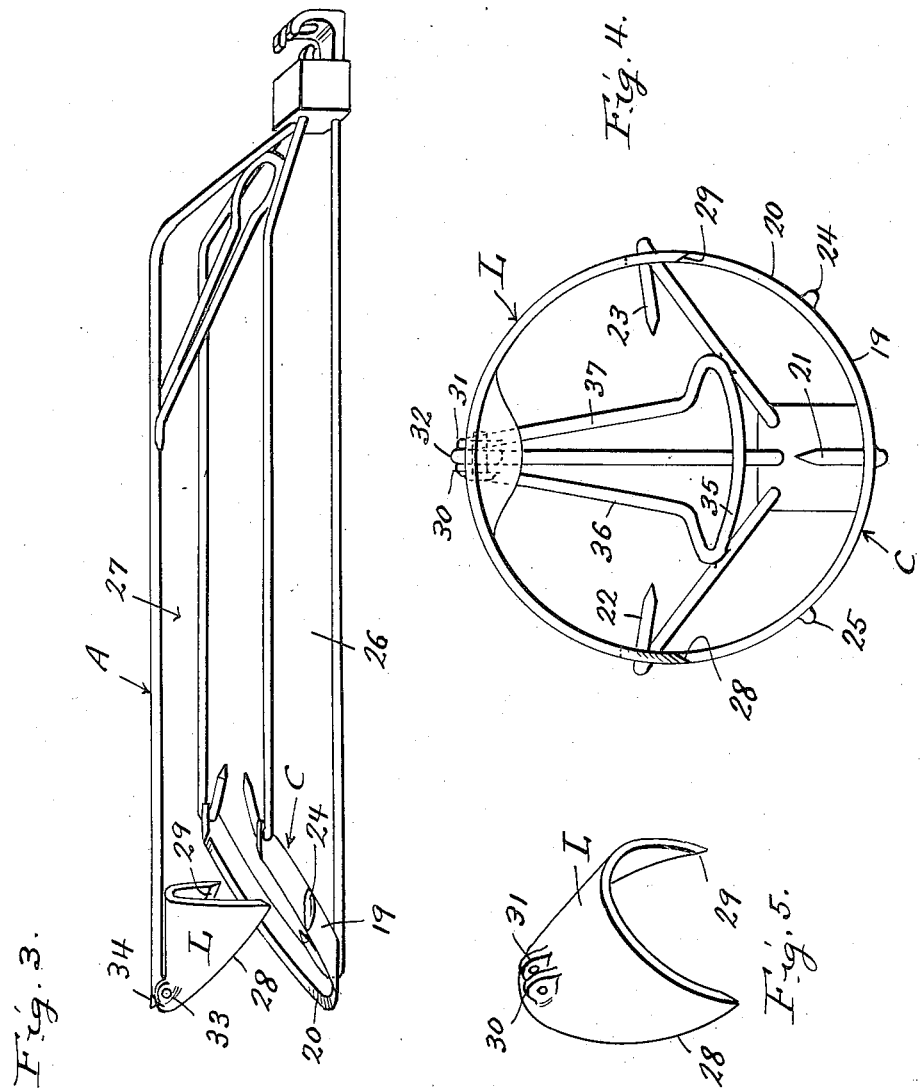

2,093,827

UNITED STATES PATENT OFFICE 2,093,827

ROOT CUTTER FOR CONDUITS

Elbert J. Brooks, Sparta, Wis.

Application October 2, 1935, Serial No. 43,274

3 Claims. (Cl. 15—104.30)

This invention relates to a root cutter for conduits.

The primary object of the present invention is to devise an implement that operates in underground conduits such as drain tile and sewer pipe which efficiently and easily cuts plants, shrub and tree roots that often grow through the joints in the conduits which roots not only clog the conduit but often displace the sections of the conduits.

Another of the features of the present invention is to devise a cutter with a passage that has storage capacity for the severed roots which utilizes one of the cutting blades of the implement to form a closure for the passage when disposed in a certain position.

Further objects of the invention are to provide a device of the character referred to that is strong, compact and durable, thoroughly reliable for its intended purpose, very simple to operate, and comparatively inexpensive to manufacture.

With the foregoing and other objects in view the invention consists in the novel construction, combination and arrangement of parts as will be hereinafter more specifically described and illustrated in the accompanying drawings, wherein is disclosed an embodiment of the invention, but it is to be understood that changes, variations and modifications may be resorted to without departing from the spirit of the claims hereunto appended.

In the drawings wherein like reference characters denote corresponding parts throughout the several views:

Figure 1 is a side elevation of a device constructed in accordance with the present invention.

Figure 2 is a top plan view thereof.

Figure 3 is a perspective view thereof.

Figure 4 is a front elevation thereof.

Figure 5 is a perspective view of the swingable cutting blade.

Referring to the drawings in detail the body portion indicated generally at A, of the cutter is elongated. The body portion A is formed of rods spaced from one another in a longitudinal direction, the upper rod being indicated at 6 and the lower rod being indicated at 7. The upper and lower rods 6, 7 lie substantially in the same plane. The body portion A is further formed of two lateral rods 8, 9, and on each side of the plane of the upper and lower rods. The lower rod 7 is straight and the rear end thereof is fixed to a metal block 10 forming the rear part of the coupling indicated generally at B. The major portion of the lateral rods 8, 9 are straight and this straight portion is toward the front of these lateral rods. The front straight portions of the lateral rods 8, 9 lie in the same plane between the upper and lower rods 6, 7. At the rear portions the lateral rods 8, 9 decline inwardly at 11, 12 and are fixed to the block 10. The rear portion of the upper rod 6 is bent downwardly as at 13 and the forward end thereof is fixed to the block 10. The inwardly declining portions 11, 12 of the lateral rods and the downwardly extending portion 13 of the upper rod form a tapering portion at the rear end of the body forward of the coupling B which facilitates the pulling of the body through the conduit after it has been forced into the same.

On the rear end of the body A is mounted as heretofore described a special fitting or coupling B, which in the form shown is particularly adapted for connection to the links of an operating device like that disclosed in my Patent 1,983,790. While I have chosen to illustrate the present invention with this character of coupling it will be understood that any style coupling may be secured to the rear end of the rods that will admit of forcing the body portion forwardly into the conduit and at the same time allow the body to be withdrawn therefrom. In the form of the coupling shown there is a right angled hook having one leg 14 fixed to the block 10. The other leg, that is, the upstanding leg 15 is bifurcated on the upper end to form inwardly curving prongs 16, 17. From the upper portion of the block there is a tongue extension 18 which lies in a plane between the prongs on the hook all of which construction forms the female part of the coupling. To this coupling B is attached the rod, links or other device which is to be used for forcing the body A into the conduit to be cleaned and withdrawing the same after the roots have been cut.

The upper and lower rods 6, 7 terminate on the front end in substantially the same plane, while the lateral rods 8, 9 are not as long as the upper and lower rods and terminate inwardly of the upper and lower rods. There is a stationary cutter blade C at the front end of the body A. This cutter blade C is formed of a bar of tool steel 19 bent into a semi-circular configuration. The bar is disposed at an inclination with the cutting edges 20 thereof on the front. The crown of the semi-circular cutting bar 19 is transfixed by the shank of an upwardly and inwardly directed hook 21 on the rear end of the lower rod 7. On the front end of the lateral rods 8, 9 are inwardly directed hooks 22, 23 which transfix the ends of the cutter bar 19. On the outside of the cutter bar 19 are spaced guide ribs 24, 25 which serve to guide the body A past uneven joints in the conduit to be cleaned. It will be seen that the arrangement of the cutting bar of the stationary cutting blade C spans and bridges the space 26 between the lower rod 7 and the lateral rods 8, 9 at the front end of the body. By having the cutting edges 20 inclining upwardly and inwardly, the edges not only cut the root as the body is forced into the conduit, but serve to direct the severed parts into the space 27 between the upper rod 6 and the lateral rods 8, 9. This space 27 provides a passage having storage capacity for the severed roots where they are held in position, as will hereinafter appear, when the body is withdrawn from the conduit. It will be seen that the passage 27 opens out of the front end of the body A.

There is a cutter L swingably mounted within certain limits on the front end of the upper rod 6 and this cutter blade is formed of an arched plate semi-circular in cross section which has cutting edges 28, 29 on each side which incline forwardly. The inclining cutting edges merge at the front end of the arched plate into substantially a blunt end from the outer face of which rise spaced ears 30, 31 which receive the eye 32 on the end of the upper rod 6. A hinge pin 33 extends through the aperture in the ears and through the eye to serve as a hinge for the cutter L. Forwardly of the eye 32 there is a projection 34 which bears against the upper face of the blunt end of the blade L and prevents the blade from swinging outwardly beyond the dotted line shown in Figure 1 of the drawings.

As the body A is forced into the conduit roots engaging the cutting edges 20 on the stationary cutter and the cutting edges 28, 29 on the movable cutter are severed and while the roots are being severed the bowed crown of the cutter L bears against the upper rod 6 as shown in Figures 1 and 3. As the body A is forced further into the conduit the severed roots pass up the inclined cutting edge 20 on the stationary cutter C between the inner ends of the cutting edges 28, 29 on the swingable cutter L, and into the storage space 27. When the space 27 is full the pulling of the body A out of the conduit causes the cutter L to swing forwardly from the position shown in Figures 1 and 3 to the dotted line position shown in Figure 1. In this latter position the cutter L locks against the projection 34 and forms a closure which prevents the severed roots from escaping from the passage 27 as the body is being withdrawn from the conduit.

The upper and lateral legs are strengthened by a forwardly inclined brace rod having a loop 35 on the rear end having the opposed edges thereof secured to portions 11, 12 of lateral rods 8, 9 and the straight legs 36, 37 secured at their ends to the center of the straight portion of upper leg 6. The lower rod 7 forms a runner to guide the body A over uneven parts of the conduit to be cleaned.

Having thus described my invention, what I claim as new is:

1. A cutter comprising an elongated body formed of rods arranged in spaced relation to provide a storage compartment between certain rods, a stationary arcuate cutting blade carried by certain of the rods at one end of the body and disposed with the cutting edges inclined inwardly, a cutting blade swingably connected to another of said rods to form a closure for the compartment when disposed in a certain position, a coupling on the other end of said body connected to said rods, and hooks on the ends of certain rods the shanks of which transfix the stationary cutting blade.

2. A cutter for conduits comprising an elongated body formed with a passage above the bottom thereof extending inwardly from one end constituting a storage compartment for severed roots and refuse, a pair of cutting blades carried by one end of the body having cutting edges converging toward the passage when the body is moved in one direction, one of said blades being stationary and the other swingable and the stationary blade serving to elevate the roots and refuse to the level of the storage compartment when the body is moved in said one direction, means carried by the body and coacting with the swingable blade at a certain position to limit the movement of the blade when the body is moved in the opposite direction in which certain position the said blade forms a closure for the passage, and a coupling carried by the other end of said body.

3. A cutter comprising an elongated body formed of a plurality of rods arranged in spaced relation to provide a storage compartment between the uppermost and intermediate rods, a stationary cutting member fixed to the ends of the lowermost and intermediate rods having a cutting edge inclined inwardly to guide severed roots and refuse into the storage compartment when the body is moved in one direction, a cutting blade swingably connected to the uppermost rod and having cutting edges converging toward the stationary cutting member when the body is moved in the aforesaid one direction, means carried by the uppermost rod and coacting with the swingable cutting member at a certain position to limit the movement of the blade when the body is moved in the opposite direction in which certain position the said blade forms a closure for the passage.

ELBERT J. BROOKS.